US008873261B1

(12) United States Patent
Cuzner

(10) Patent No.: US 8,873,261 B1
(45) Date of Patent: Oct. 28, 2014

(54) CURRENT SOURCE RECTIFIER MODULATION IN DISCONTINUOUS MODES OF OPERATION

(71) Applicant: DRS Power & Control Technologies, Inc., Milwaukee, WI (US)

(72) Inventor: Robert M. Cuzner, Milwaukee, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 0 days.

(21) Appl. No.: 13/905,050

(22) Filed: May 29, 2013

Related U.S. Application Data

(60) Provisional application No. 61/821,604, filed on May 9, 2013.

(51) Int. Cl.
*H02M 7/217* (2006.01)
(52) U.S. Cl.
CPC ..................... *H02M 7/217* (2013.01)
USPC .......................................... 363/127
(58) Field of Classification Search
CPC .......... H02M 7/02; H02M 7/21; H02M 7/217
USPC ............. 363/44, 52, 53, 89, 125, 127
See application file for complete search history.

(56) References Cited

U.S. PATENT DOCUMENTS

| 6,618,274 | B2 * | 9/2003 | Boylan et al. ................ 363/17 |
| 6,771,059 | B1 * | 8/2004 | Zwicker ...................... 324/119 |
| 7,511,976 | B2 * | 3/2009 | Zargari et al. ................ 363/50 |
| 7,869,231 | B2 * | 1/2011 | Cohen ......................... 363/21.14 |
| 7,965,526 | B2 * | 6/2011 | Zargari et al. ................ 363/50 |
| 8,035,995 | B2 * | 10/2011 | Young et al. ................ 363/17 |
| 8,264,169 | B2 * | 9/2012 | Shteynberg et al. ......... 315/307 |
| 8,350,397 | B2 * | 1/2013 | Lang et al. ................... 290/44 |
| 8,488,345 | B2 * | 7/2013 | Tallam et al. ................ 363/37 |
| 8,569,976 | B2 * | 10/2013 | Shteynberg et al. ......... 315/307 |

* cited by examiner

*Primary Examiner* — Adolf Berhane
(74) *Attorney, Agent, or Firm* — Kilpatrick Townsend & Stockton LLP

(57) ABSTRACT

Systems and methods disclosed herein include a controller for a current source rectifier that is configured to facilitate operation in both continuous and discontinuous conduction modes. The controller comprises a discontinuous mode detection unit configured to determine when input current of the current source rectifier becomes discontinuous and a duty cycle calculation unit adapted to calculate duty cycles for the current source rectifier differently for operation in continuous or discontinuous mode. The controller is adapted to transition to a mode of operation to provide an input current that approximates a sinusoidal current during both the continuous and discontinuous modes of operation. The controller outputs control signals to turn on one or more of the electrical switches in the current source rectifier based on the calculated duty cycles.

23 Claims, 14 Drawing Sheets

CURRENT SOURCE RECTIFIER MODULATION IN DISCONTINUOUS MODES OF OPERATION

CROSS-REFERENCES TO RELATED APPLICATIONS

This application claims priority to U.S. Provisional Patent Application No. 61/821,604, filed May 9, 2013, entitled "CURRENT SOURCE RECTIFIER MODULATION IN DISCONTINUOUS MODES OF OPERATION," the disclosure of which is hereby incorporated by reference in its entirety for all purposes.

FIELD OF THE INVENTION

The embodiments described herein relate generally to current source rectifiers. More particularly, the embodiments described herein relate to a method of modulating a current source rectifier in discontinuous modes of operation. Merely by way of example, the embodiments described herein include dead-beat current injection modulation of a current source rectifier in both continuous and discontinuous modes of operation. These and other embodiments along with many of their advantages and features are described in more detail in conjunction with the description below and corresponding figures.

BACKGROUND OF THE INVENTION

Conventional current source rectifiers assume operation in continuous mode where current flows through the direct current ("DC") link inductor of the current source rectifier. In order to maintain continuous conduction of current through such a DC link inductor, either a large inductor has to be used, which negatively affects the size and power density of the current source rectifier, or the input current has to be maintained at a sufficiently high switching frequency, which negatively affects the efficiency of the current source rectifier. For this reason, voltage source rectifiers have been preferred over current source rectifiers for many applications that require small size or lower switching frequencies. However, voltage source rectifiers experience numerous problems that cause unwanted distortion on and conducted electromagnetic emissions into the input voltage and current sources. These problems can be mitigated using additional input filtering hardware, but this leads to additional size and thus even lower power density.

The current source rectifier is an attractive alternative to the voltage source rectifier, more widely used by industry, because it can achieve AC-to-DC voltage conversion with nearly sinusoidal input currents with less input filter components as well as with a smaller overall size. Current source rectifiers depend upon a continuous DC link current in order to convert alternating current ("AC") input voltages to DC output voltages. That is, conventional current source rectifiers are built upon the assumption that the DC link current, such as $i_p$ shown in FIG. 1A, does not fall below zero during operation.

This is accomplished by keeping the inductance value or the input switching frequency and the average load current at sufficiently high values such that $i_p$ appears as a constant current source. The switching frequency and inductance are also typically selected such that the voltage ripple on $i_p$ is less than 10% of its rated value. But at a sufficiently light load values, the current source rectifier will enter discontinuous conduction mode of operation. The load at which discontinuous mode occurs will be more significant and more prevalent as the size of the DC link inductor $L_p$ is reduced to improve power density or when the switching frequency is reduced to improve efficiency. Thus, conventional current source rectifiers simply attempt to avoid discontinuous operation by increasing the size of the DC link inductor $L_p$ (thus reducing power density) or increasing the input switching frequency (thus reducing efficiency); or by adding additional hardware, such as dynamic braking, in order to avoid discontinuous operation altogether. These measures often make the current source rectifier an unattractive alternative for many applications.

FIG. 1A depicts an example block diagram of a conventional controller for a current source rectifier according to the prior art. The current source rectifier 110 shown in FIG. 1A is an active AC-to-DC rectifier that converts three-phase AC input power to a controlled DC voltage through an active rectification process and drives a constant power load 104. In the illustration, the three-phase AC input power is shown coming off of an AC power grid 102 and is provided to the current source rectifier 110 through input lines a, b, and c. A conventional controller 101 receives the input voltages via signal drivers 106 and 108. The conventional controller 101 also receives output voltage $v_o$ as well as the DC link current $i_p$ through the inductor $L_P$ from the current source rectifier 110. Controller 101 then provides control signals $U_{i1}$-$U_{i6}$ to control the switches $S_{i1}$-$S_{i6}$ of the current source rectifier 110, respectively.

FIG. 1B depicts an example block diagram of some of the main components of a conventional controller for a current source rectifier. As shown, conventional controller 101 includes feed-forward controls 120 and feedback controls 124. These units receive the output voltage $v_o$ as well as user selection of a desired output voltage $v_o$*. The feedback controls 124 provide the modulation index $m_i$ to the duty cycle calculation unit 130. The duty cycle calculation unit 130 also receives the phase value $\phi$ of the three-phase input power and calculates the duty cycles $d_k\_CCM$ and $d_n\_CCM$ based on those values. The calculated duty cycles control the signal pulses $d_k$ that are provided to the current source rectifier to control the switches $S_{i1}$-$S_{i6}$ of the current source rectifier.

As used herein, the acronym "CCM" stands for "continuous conduction mode" and represents the fact that, for conventional current source rectifiers, it is assumed that the current through the DC link inductor is continuous during operation. When discontinuous conduction mode ("DCM") occurs in a conventional current source rectifier, the resultant input currents exhibit low order harmonic distortion and a voltage boosting effect occurs on the output such that the output voltage of the current source rectifier is difficult to control. Even worse, when discontinuous conduction occurs in conventional current source rectifiers, it can also cause voltage stresses to occur on power semiconductor devices that can cause damage. These phenomena are graphically demonstrated in FIG. 2, which depicts example graphs showing characteristics of a conventional current source rectifier during discontinuous conduction mode of operation. The output voltage graph 201 demonstrates a loss of control of the output voltage $v_o$. At startup, the output voltage $v_o$ far exceeds the user-selected output voltage $v_o$*. Further, the input current graphs 204 demonstrate high distortion on the average input current $<i_k>$, which is shown by the clipping pattern where the input signal should be substantially sinusoidal. The input currents are referred to herein generally as $<i_k>$ and $<i_n>$, which represent the input current on any two of the three input phases $i_a$, $i_b$ or $i_c$. These undesirable side-effects are caused during discontinuous conduction mode when at least part of the DC link current $i_p$ falls below zero as shown in graphs 206.

These undesirable side-effects are usually mitigated by dissipative circuitry to keep the current source rectifier from going too deeply into discontinuous conduction mode. Unfortunately this further increases the size of the circuit and reduces efficiency. Emerging low power applications (e.g., <10 kW) use Silicon Carbide ("SiC") metal-oxide semiconductor field-effect transistors ("MOSFETs") in current source rectifiers in order to allow very high switching frequency and reasonable efficiency. But SiC MOSFETs are expensive and have limited availability in size and range.

SUMMARY OF THE DESCRIPTION

Figure 1A:
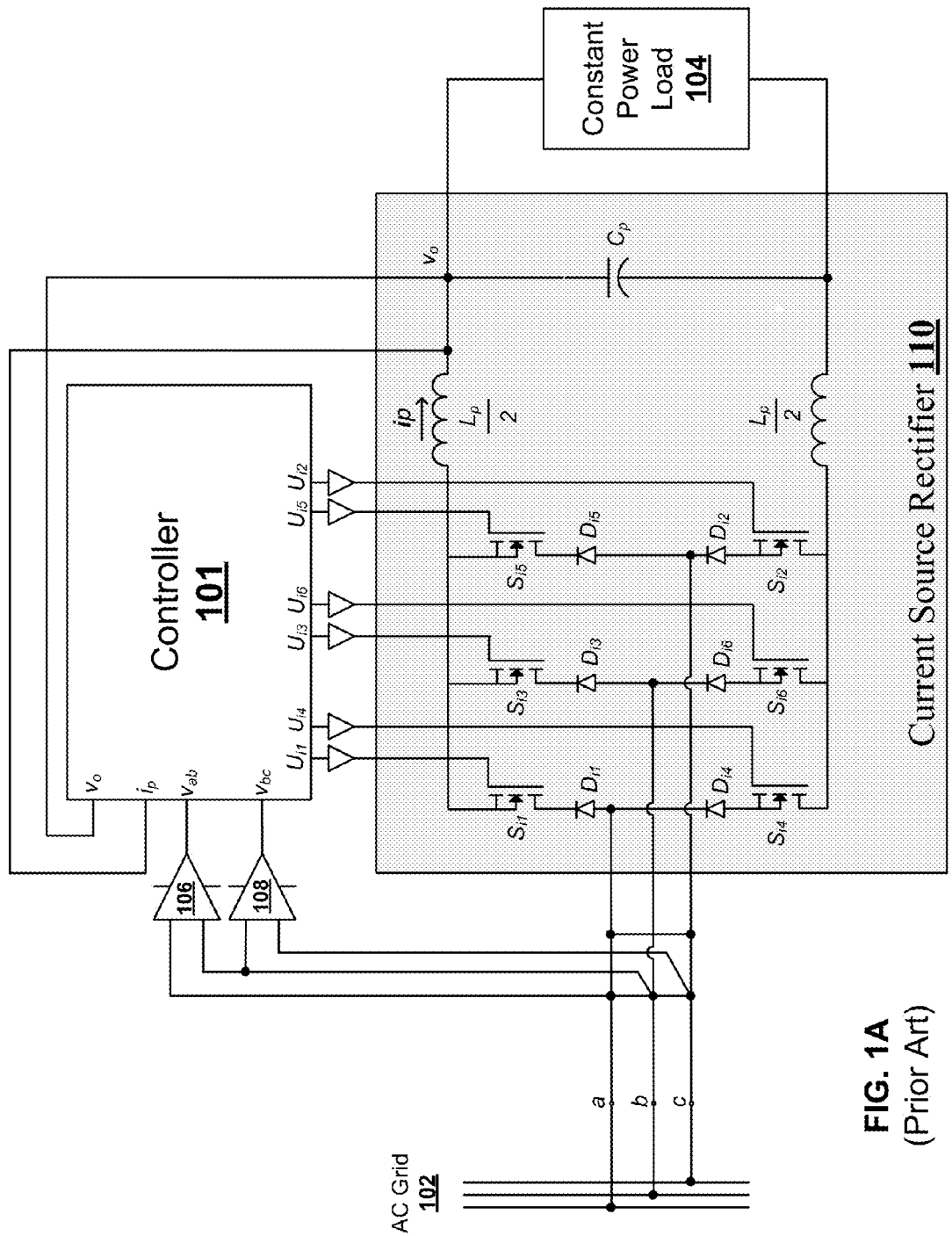
FIG. 1A depicts an example block diagram of a conventional controller for a current source rectifier.
Figure 1B:
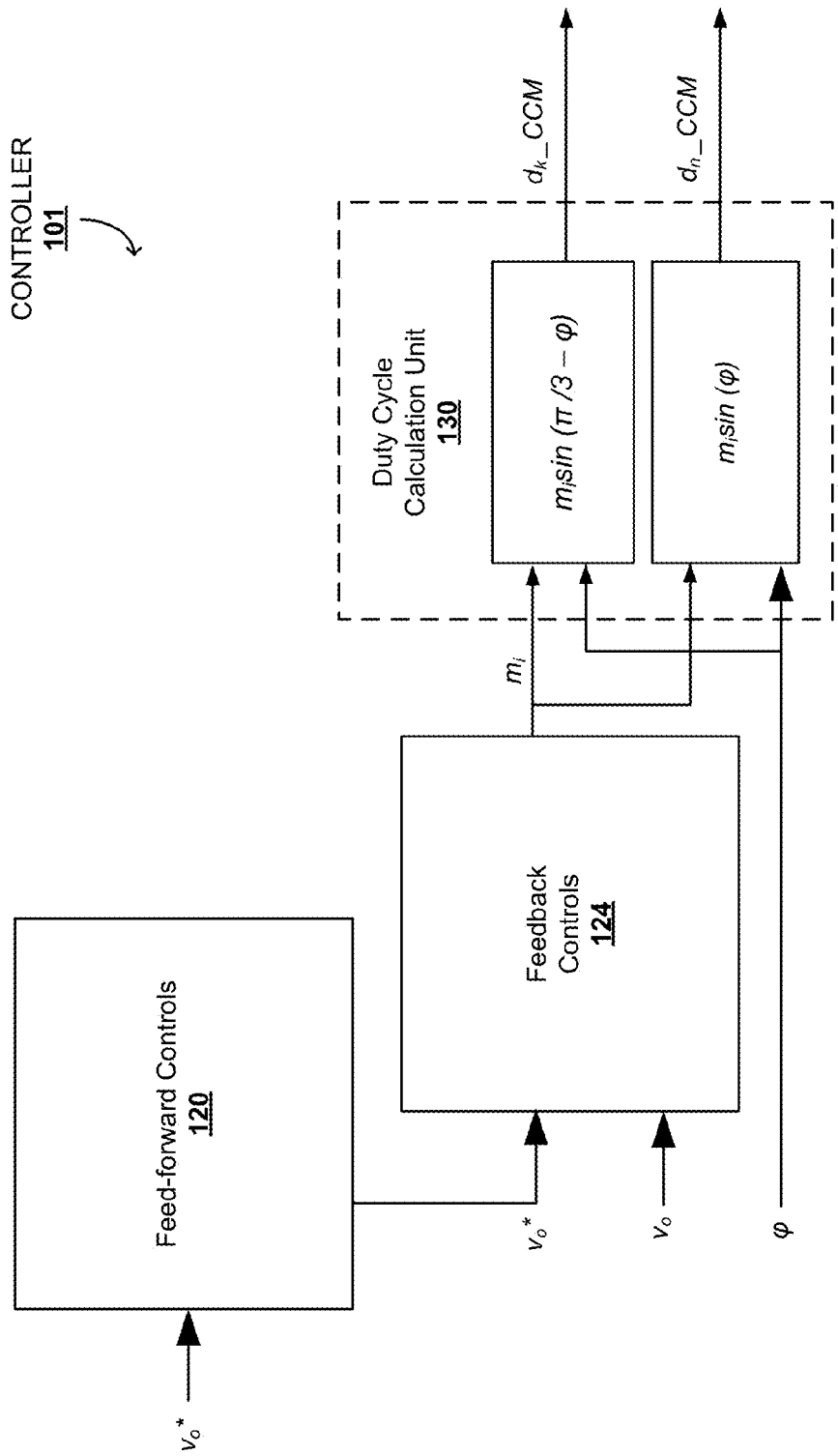
FIG. 1B depicts an example block diagram of the components of a conventional controller for a current source rectifier.

The embodiments described herein relate generally to current source rectifiers. More particularly, the embodiments described herein relate to a method of modulating a current source rectifier during discontinuous modes of operation. Merely by way of example, the embodiments described herein include dead-beat current injection modulation techniques for current source rectifiers in discontinuous modes of operation.

Systems, apparatuses, and methods disclosed herein include a controller for a current source rectifier that is adapted to transition between continuous and discontinuous modes of operation in order to provide an input current that approximates a sinusoidal input current during both modes of operation. The controller includes a discontinuous mode detection unit configured to detect when the DC link current of the current source rectifier becomes discontinuous and a duty cycle calculation unit adapted to calculate duty cycles for the current source rectifier differently for operation in continuous or discontinuous mode. The controller is adapted to output control signals to turn on one or more of the electrical switches in the current source rectifier based on the calculated duty cycles.

Numerous advantages are achieved by way of the techniques described herein over conventional techniques. Embodiments are adapted to detect whether a current source rectifier is in CCM or DCM, and then to switch between different calculations of duty cycle accordingly. For example, embodiments provide revised calculations for the duty cycles associated with active electrical switches of a current source rectifier that will ensure the filtered or time-averaged three-phase input currents are nearly sinusoidal and the input-to-output voltage ratio is linear.

These and other embodiments, along with many of their advantages and features, are described in more detail in conjunction with the description below and corresponding figures.

DETAILED DESCRIPTION OF SPECIFIC EMBODIMENTS

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

The systems and methods introduced herein are adapted to provide a controller for a current source rectifier that is adapted to transition between the continuous and discontinuous modes of operation in order to provide an input current that approximates a sinusoidal input current during both modes of operation. The controller includes a discontinuous mode detection unit configured to detect when the DC link current of the current source rectifier becomes discontinuous and a duty cycle calculation unit adapted to calculate duty cycles for the current source rectifier differently for operation in continuous or discontinuous mode. The controller is adapted to output control signals to turn on one or more of the electrical switches in the current source rectifier based on the calculated duty cycles. At least certain embodiments of the controller provide what is known as Dead-Beat Current Injection ("DBCI") techniques for pulse-width modulation ("PWM") of the current source rectifier that will ensure nearly sinusoidal input current and linear input-to-output voltage control during discontinuous or continuous conduction modes of operation. These embodiments can also facilitate seamless transitions between CCM and various levels and conditions of DCM.

The techniques described herein enable the application of current source rectifiers with conventional silicon-based devices without paying the penalty in efficiency because there is no need to avoid DCM operation. These techniques may also open up more opportunity for current source rectifier applications at higher power levels because the penalty of a large DC link inductance can be avoided. The techniques described herein include DBCI PWM control for the current source rectifier that enables operation with a lower switching frequency to achieve higher efficiency and a lower DC link inductance value to achieve smaller size and higher power density because DCM operation is handled without the side effects of input current distortion or loss of voltage control. These techniques can dynamically select the turn-on times for the electrical semiconductor switches in a current source rectifier such that a proper volt-seconds balance across DC link inductor $L_p$ can be maintained.

At least certain embodiments include a new control method for the current source rectifier that can determine the appropriate amount of time two of the three line-to-line input voltages are applied to the input side of the current source rectifier depending upon: (1) whether the DC link current will become discontinuous before the next switch cycle; and (2) whether one or more of the two applied input voltages is greater than, equal to, or less than the output voltage. Dead-beat controls, by definition, utilize the calculated voltage drop across the DC link inductor $L_p$ in order to decide upon the optimal time for pulsed control voltages to be applied across $L_p$. Current injection refers to the fact that current pulses injected into the current source rectifier during a PWM commutation are controlled to achieve a desired average input current. These techniques include a method for detecting whether the current source rectifier is in CCM or DCM and then for switching between the calculations for the on-time of active switches of the current source rectifier.

Figure 3A:
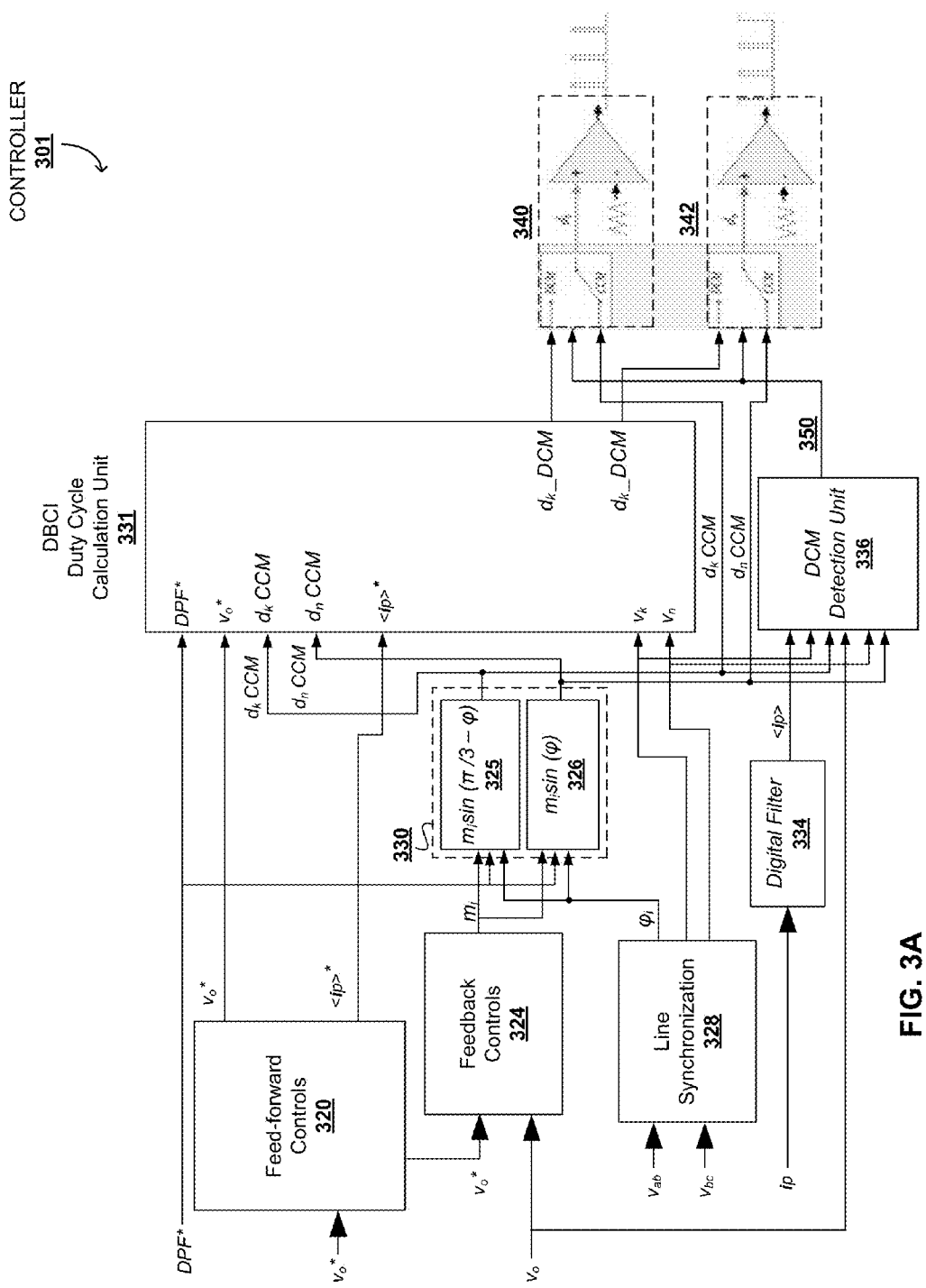
FIG. 3A depicts an example block diagram of a controller for a current source rectifier according to one embodiment.
Figure 5:
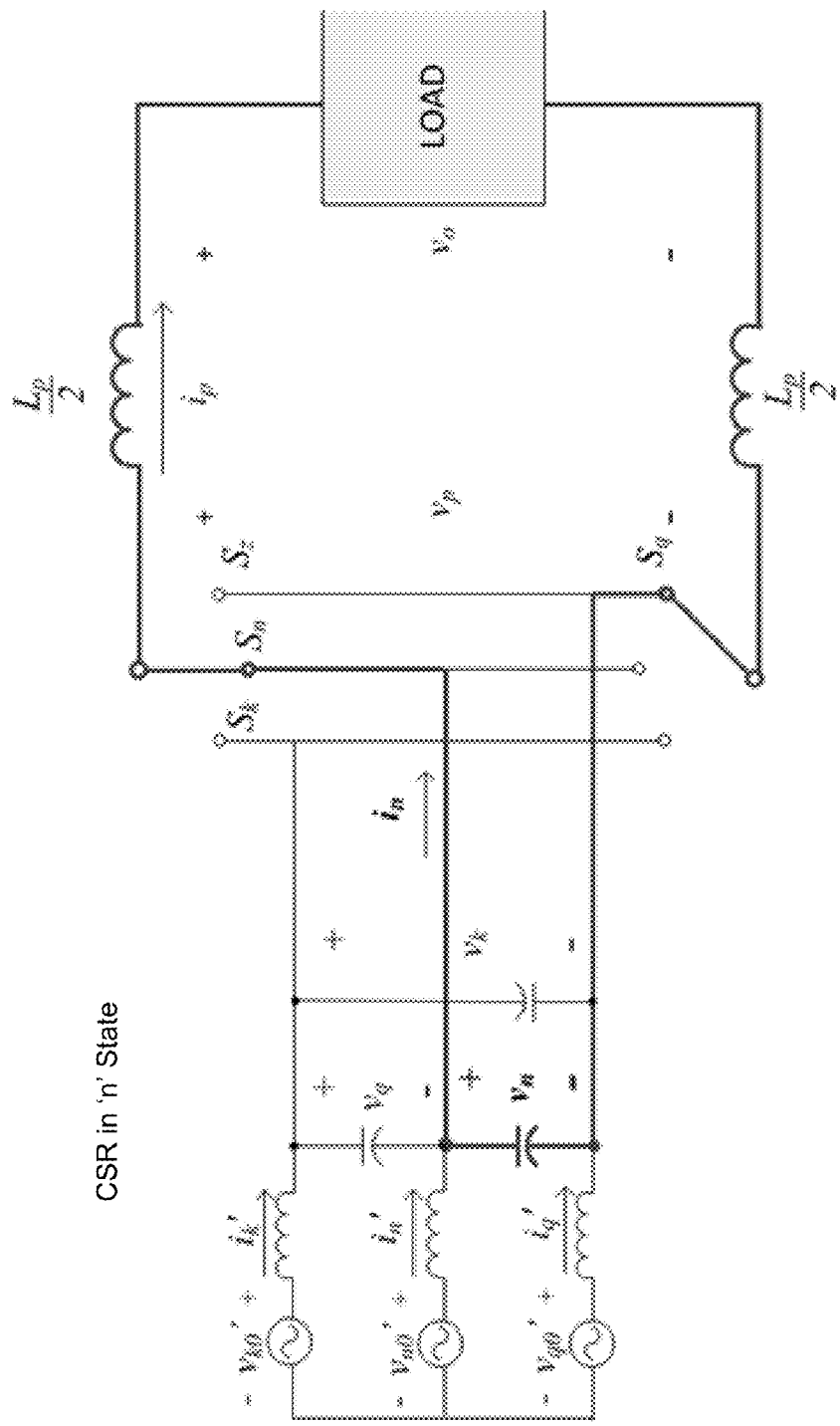
FIG. 5 depicts an example of a current source rectifier in a second switch state according to one embodiment.
Figure 6:
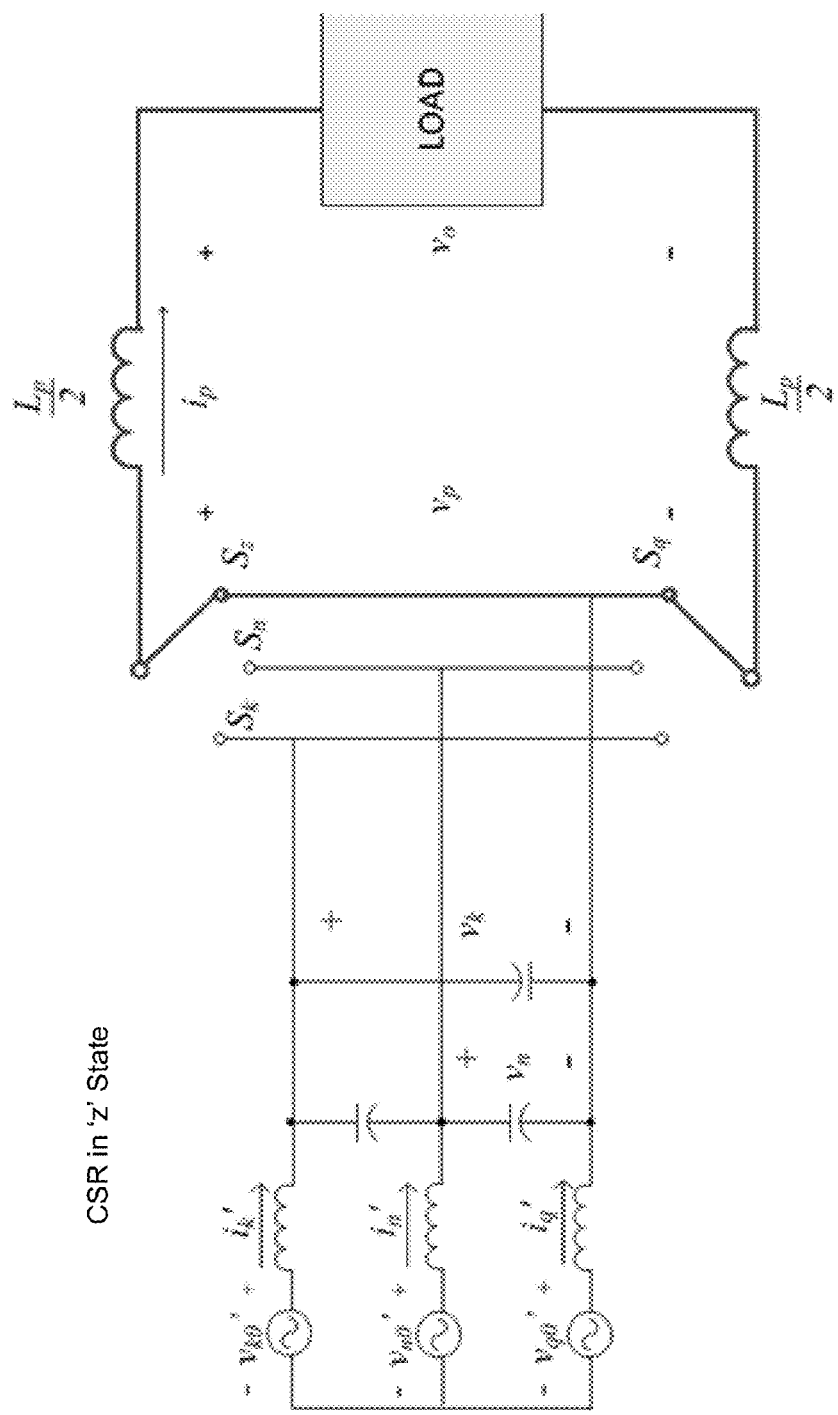
FIG. 6 depicts an example of a current source rectifier in a third switch state according to one embodiment.

FIG. 3A depicts an example block diagram of a controller for a current source rectifier according to one embodiment. At any instant of time, the current source rectifier has two or three PWM controlled switches, one switch held on and either two or three switches held off (depending on whether or not a freewheeling diode is present to provide a path for the current from the DC link inductor $L_p$. If there is no freewheeling diode then the current source rectifier will commutate between the three switch states shown in FIGS. 4-6 below. If there is a freewheeling diode then the switch state of FIG. 6 is not used and the freewheeling diode provides the path for current during the zero state.

In the illustrated embodiment of FIG. 3A, controller 301 for the current source rectifier (not shown) includes feed-forward controls 320, feedback controls 324, a line synchronization unit 328, a digital filter 334, a DCM detection unit 336, a conventional CCM duty cycle calculation unit 330, and a DBCI duty cycle calculation unit 331. The controller 301 further includes output drivers 340 and 342 to provide the signal pulses to the current source rectifier in accordance with the calculated duty cycles.

Controller 301 includes a DCM detection unit 336 adapted to determine when the current source rectifier enters DCM and to adjust the calculations of the duty cycles accordingly. DCM detection unit 336 provides a signal along line 350 that selects between CCM and DCM operation based on whether DCM is detected. During CCM operation, the CCM inputs to drivers 340 and 342 is selected and the conventional CCM duty cycle calculation unit 330 provides the duty cycles $d_k\_CCM$ and $d_n\_CCM$ according to the prior art discussion above. During DCM, the DCM inputs to drivers 340 and 342 is selected and the DBCI duty cycle calculation unit 331 provides the duty cycles $d_k\_DCM$ and $d_n\_DCM$ according to the techniques described herein. One embodiment of the internal components of the DCM detection unit 336 is shown in FIG. 3B.

Figure 3B:
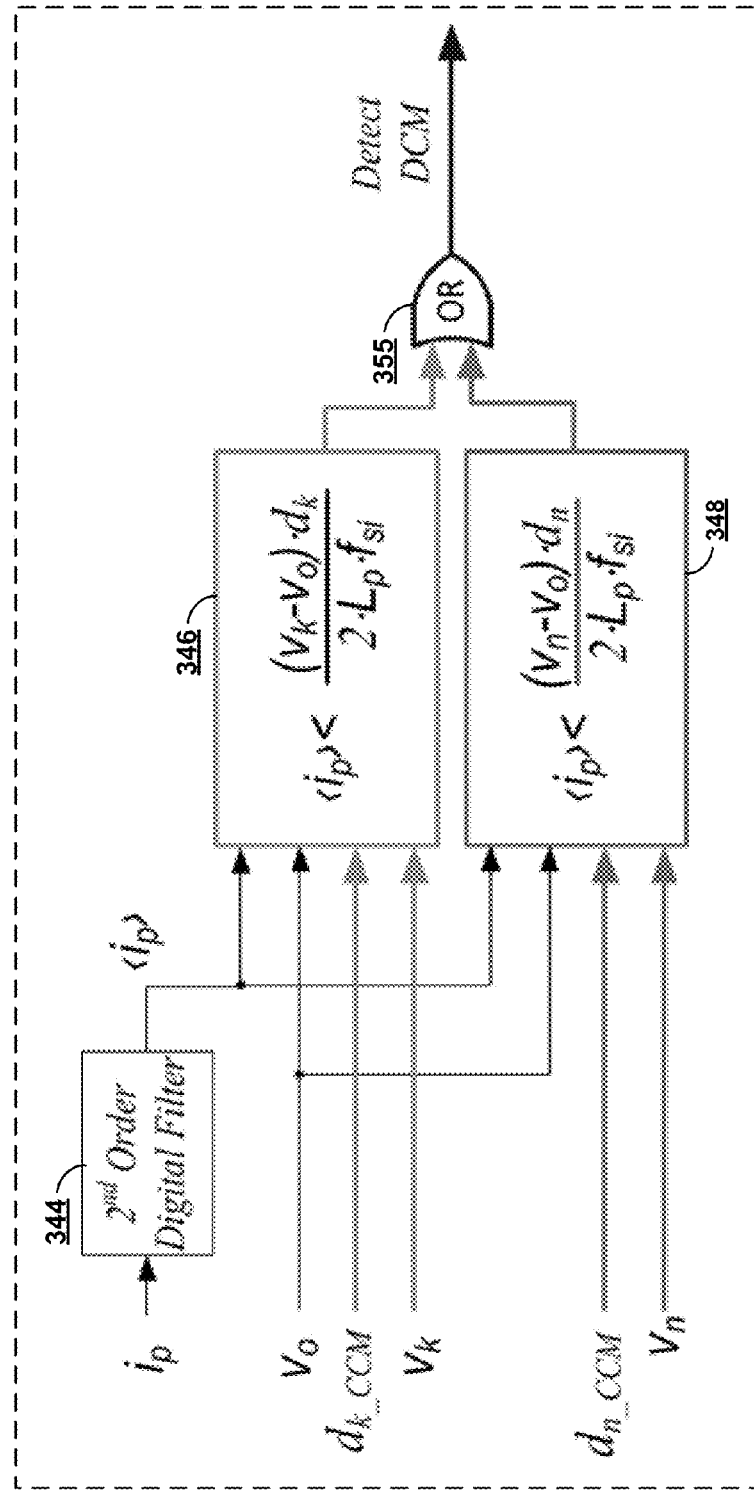
FIG. 3B depicts an example block diagram of a discontinuous mode detection unit of a controller for a current source rectifier according to one embodiment.

FIG. 3B depicts an example block diagram of a discontinuous mode detection unit of a controller for a current source rectifier according to one embodiment. In the illustrated embodiment, DCM detection unit 336 includes a 2nd order digital filter 334 to receive the DC link current $i_p$ and provide a time-averaged version of the DC link current signal $\langle i_p \rangle$, which is used by calculation units 346 and 348 (along with other inputs vo, vn, vk, and $d_k\_CCM$ and $d_n\_CCM$) to determine when the current source rectifier enters DCM. An "OR" gate 355 is provided such that if either condition is true in calculation units 346 and 348, DCM is detected and a signal is provided on the output of the detection unit 336.

Figure 7:
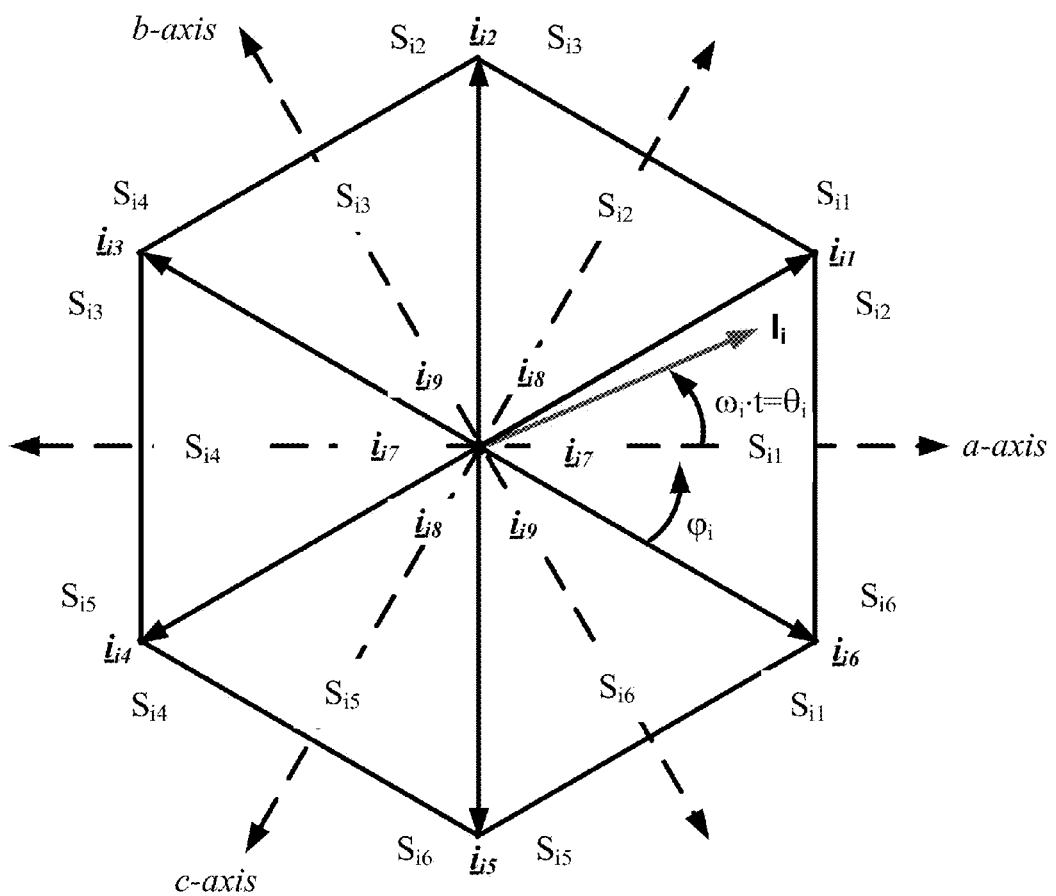
FIG. 7 depicts an example representation of a phasor diagram for use with certain embodiments.

In order to understand how the current source rectifier is controlled, consider the phasor diagram in FIG. 7, which divides the electrical cycle of the incoming three-phase voltages and currents $\theta_i$ into six equal 60 degree sectors. As can be seen, the current source rectifier switch states have been superimposed on the abc phase plane of the phasor diagram. Three (or four) active switches of the current source rectifier and the two applied line-to-line voltages or three applied line-to-neutral voltages change every 60 degree sector. $S_k$ and $S_n$ denote the two PWM-controlled switches, $S_q$ denotes the switch that is held on, and $S_z$ denotes the switch for the zero state (if used). For conventional current source rectifiers, three-phase input currents are typically synthesized by controlling the amount of time PWM-controlled switches $S_k$ and $S_n$ are turned on over a switching frequency period according to equations 1-3 below, where the duty cycles are given by equations 4-6.

$$T_k = d_k(\phi_i) \cdot T_{si} \qquad 1$$

$$T_n = d_n(\phi_i) \cdot T_{si} \qquad 2$$

$$T_o = [1 - d_k(\phi_i) - d_n(\phi_i)] \cdot T_{si} \qquad 3$$

where $$d_k(\varphi_i) = m_i \cdot \sin\left(\frac{\pi}{3} - \varphi_i\right) \qquad 4$$

$$d_n(\phi_i) = m_i \cdot \sin(\phi_i) \qquad 5$$

$$T_{si} = \frac{1}{f_{si}} \qquad 6$$

The angle $\phi_i$ is related to $\theta_i$ by the following relationship:

$$\varphi_i(t) = \int \omega_i(t) \cdot dt + \frac{\pi}{6} \qquad 7$$

where $\phi_i$ resets to zero at $$\theta_i = \frac{\pi}{6}, \frac{\pi}{2}, \frac{5 \cdot \pi}{6}, \frac{7 \cdot \pi}{6}, \frac{3 \cdot \pi}{2}, \frac{11 \cdot \pi}{6} \qquad 8$$

and each of the above values of $\theta_i$ represents entry into a subsequent 60 degree sector and exit from a previous 60 degree sector.

Figure 3C:
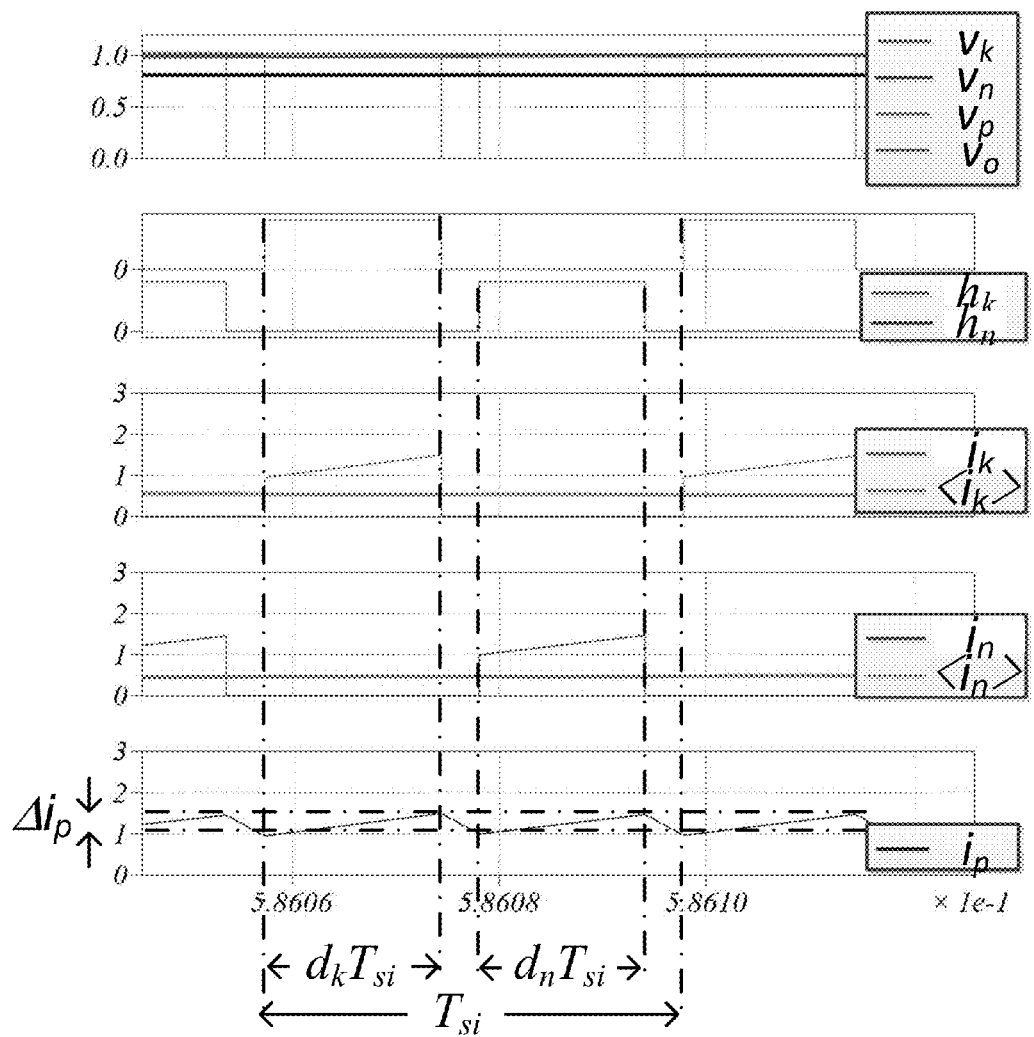
FIG. 3C depicts a graph demonstrating $h_k$, $h_n$, $i_p$, and $<i_p>$ for the current source rectifier operating in CCM according to one embodiment.

One way to control the current source rectifier is to compare the duty cycles of equations 4 and 5 to symmetrical triangle waves that vary with the switching frequency $f_{si}$ and are 180 degrees out of phase with each other in order to produce the gating signals for the PWM-controlled switches $S_k$ and $S_n$. Switching functions $h_k$ and $h_n$ result from a comparison between duty cycles $d_k$ and $d_n$, respectively, and the two triangle waves 180 degrees out of phase with each other. When $h_k/h_n$ is high, switch $S_k/S_n$ is turned on and when $h_k/h_n$ is low switch $S_k/S_n$ is turned off. FIG. 3C depicts a graph demonstrating $h_k$, $h_n$, $i_p$, and $<i_p>$ for the current source rectifier operating in CCM according to one embodiment. Table 1 below shows how the switches of FIG. 1A are assigned in each sector. Those switch states that are generated through comparison with 180 degree phase-shifted triangles are designated by the shaded cells under the $S_k$ and $S_n$ headings for each sector.

TABLE 1

Pole voltages and currents in each sector

| Electrical Angle (□) | Sector | Sector Switches | | PWM Controlled Switches | | Pole Voltages | | | | Pole Currents | |
|---|---|---|---|---|---|---|---|---|---|---|---|
| | | $S_q$ | $S_z$ | $S_k$ | $S_n$ | $v_k$ | $v_n$ | $v_{k0}$ | $v_{n0}$ | $i_k$ | $i_n$ |
| 330° | 1 | $S_{i1}$ | $S_{i4}$ | $S_{i6}$ | $S_{i2}$ | $v_{ab}$ | $-v_{ca}$ | $-v_b$ | $-v_c$ | $-i_b$ | $-i_c$ |
| 30° | 2 | $S_{i2}$ | $S_{i5}$ | $S_{i1}$ | $S_{i3}$ | $-v_{ca}$ | $v_{bc}$ | $v_a$ | $v_b$ | $i_a$ | $i_b$ |
| 90° | 3 | $S_{i3}$ | $S_{i6}$ | $S_{i2}$ | $S_{i4}$ | $v_{bc}$ | $-v_{ab}$ | $-v_c$ | $-v_a$ | $-i_c$ | $-i_a$ |
| 150° | 4 | $S_{i4}$ | $S_{i1}$ | $S_{i3}$ | $S_{i5}$ | $-v_{ab}$ | $v_{ca}$ | $v_b$ | $v_c$ | $i_b$ | $i_c$ |
| 210° | 5 | $S_{i5}$ | $S_{i2}$ | $S_{i4}$ | $S_{i6}$ | $v_{ca}$ | $-v_{bc}$ | $-v_a$ | $-vb$ | $-i_a$ | $-i_b$ |
| 270 | 6 | $S_{i6}$ | $S_{i3}$ | $S_{i5}$ | $S_{i1}$ | $-v_{bc}$ | $v_{ab}$ | $v_c$ | $v_a$ | $i_c$ | $i_a$ |

As discussed above, a current source with a freewheeling diode does not require the switching of $S_z$ in order to create the zero state. Instead, the freewheeling diode automatically creates the zero state by providing a path through which DC link inductor current can flow when the devices are switched off.

Figure 4:
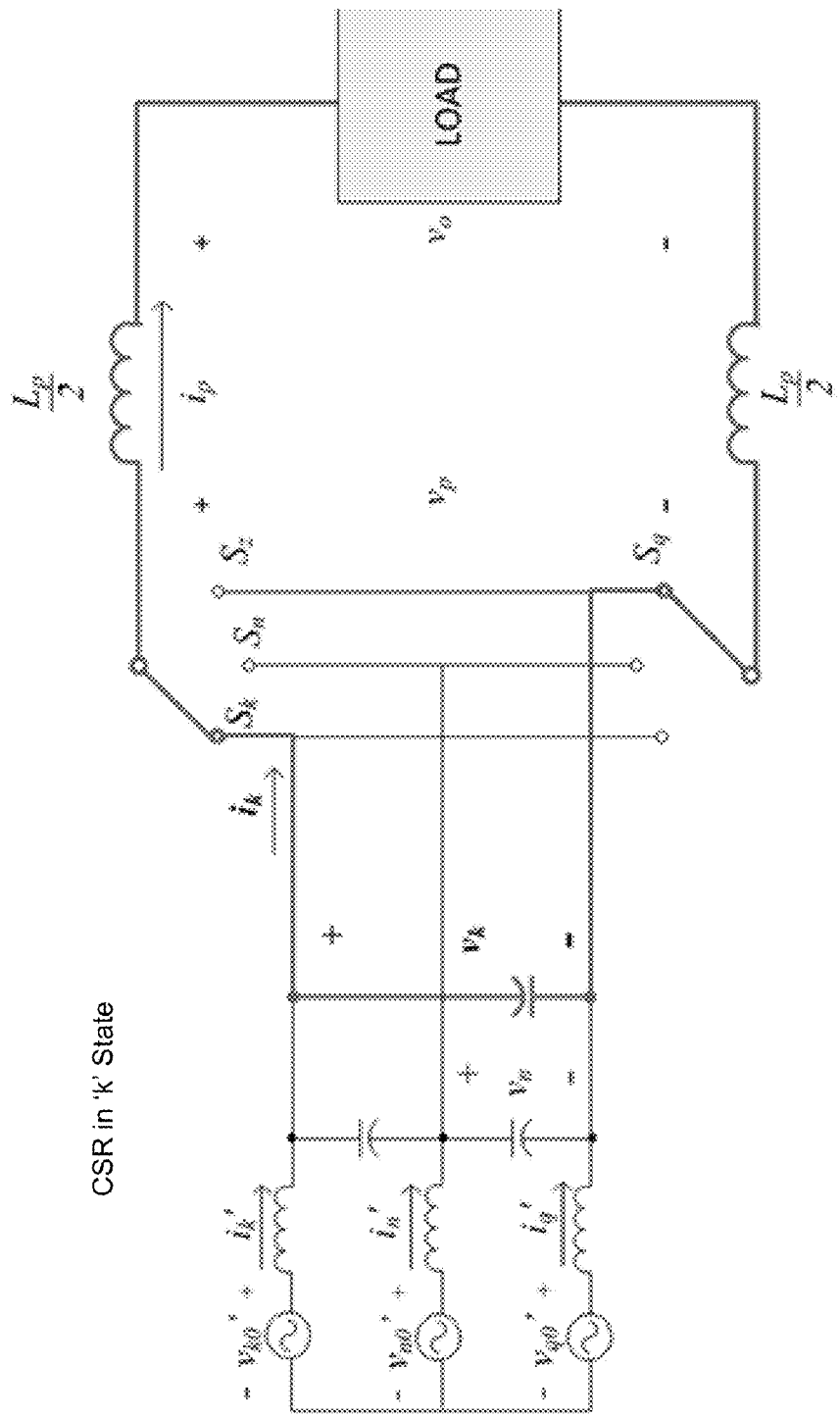
FIG. 4 depicts an example of a current source rectifier in a first switch state according to one embodiment.

PWM operation of the current source rectifier can be understood by restricting the analysis to a single 60° sector. FIGS. 4-6 show the current source rectifier circuit 110 of FIG. 1A during its three commutation stages for a single sector (Sector 2) with its two active switch states (FIGS. 4 and 5) and the zero or null state (FIG. 6). The two active switch states are named for the active switch, denoted as either the 'k' switch or the 'n' switch. The sector is named for the switch that is held on, the 'q' switch. The zero state is produced by switching on the 'z' switch. This 'k-n-q-z' convention is followed from this point forward in the discussion herein. The 'k-n-q-z' switches change every sector, as do the input pole voltages (the line-to-line voltage across the associated input capacitor) designated as $v_k$ and $v_n$ and the pole currents (the currents that flow through the active switch when it is on) designated as $v_k$ and $v_n$. Table 1 above shows the pole voltages and currents that are assigned to $v_k$, $v_n$, $i_k$ and in for each sector.

FIGS. 4-6 depict example block diagrams of a current source rectifier operating in different switch states according to one embodiment. The assignment of the applied line-to-line voltages $v_k$ and $v_n$, input currents $i_k$ and $i_n$, and equivalent line-to-neutral voltages $v_{k0}$ and $v_{n0}$ for each sector is shown in Table 1 above. In a given sector, the current source rectifier PWM-controlled switches ($S_k$ and $S_n$) and full on switch ($S_q$) connect two AC input voltages to the DC link inductor $L_p$, and synthesize a DC voltage through PWM control that is lower than the peak line-to-line voltage of the two voltages. However, depending on when the voltage is connected through $S_k$, $v_k$, or $S_n$, $v_n$, the peak input voltage occurs at a different time instant within the sector, and, depending on the modulation index $m_i$ one of the voltages at a given instant within the sector may be lower than the DC output voltage $v_o$.

FIG. 4 depicts an example of a current source rectifier in a first switch state according to one embodiment. In the illustrated embodiment, this active switch state is referred to as the 'k' switch state. In this state, the input voltage across the DC link inductor $L_p$ is $v_k$ and the current $i_k=i_p$ flows through $L_p$. In order to reach this state, switches $S_k$ (e.g., $S_{i1}$ from FIG. 1A) and $S_q$ are turned on while the other switches in the current source rectifier remain turned off. FIG. 5 depicts an example of a current source rectifier in a second switch state according to one embodiment. In the illustrated embodiment, this active switch state is referred to as the 'n' switch state. In this state, the input voltage across the DC link inductor $L_p$ is $v_n$ and the current $i_n=i_p$ flows through $L_p$. In order to reach this state, switches $S_n$ (e.g., $S_{i3}$ from FIG. 1A) and $S_q$ are turned on while the active switches in the current source rectifier remain turned off. FIG. 6 depicts an example of a current source rectifier in a third switch state according to one embodiment. In the illustrated embodiment, this switch state is referred to as the 'z' or 'zero' switch state. In this state, there is no input voltage applied across the DC link inductor $L_p$ and thus current $i_p$ flows to ground and dissipates in the load. In order to reach this state, switches $S_z$ (e.g., $S_{i5}$ from FIG. 1A) and $S_q$ are turned on while the other active switches in the current source rectifier remain turned off.

Figure 8:
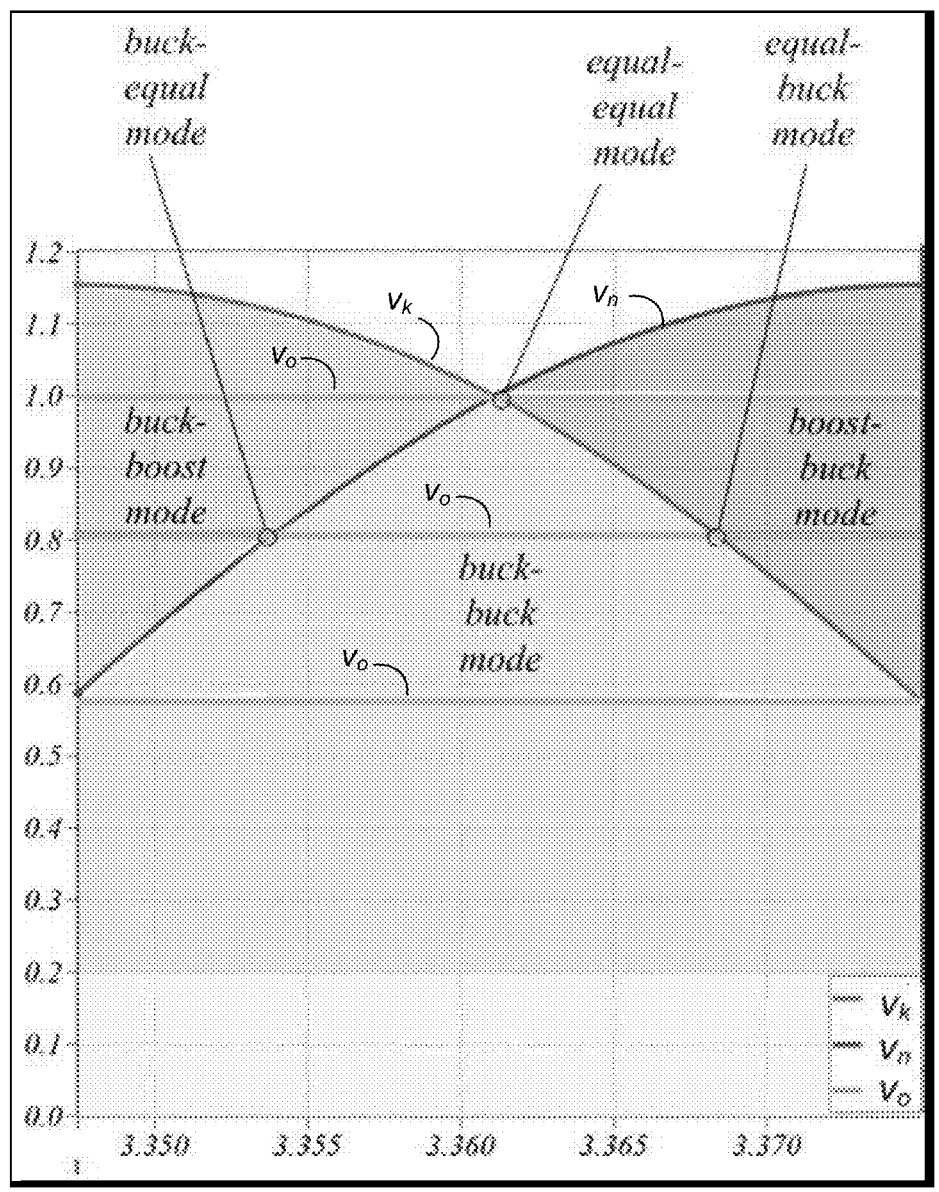
FIG. 8 depicts an example graph of input-to-output voltage ratios of the current source rectifier according to one embodiment.

Different modes of operation exist during one sector depending on the amplitude relationships between $v_k$, $v_n$ and $v_o$. The identification of different operating modes has to do with the fact that under some conditions, one of the time-varying input voltages $v_k$ or $v_n$ is lower than the output voltage $v_o$ (boost mode). The relationships between the two AC input voltages, $v_k$ and $v_n$, and the output voltage $v_o$ is shown in FIG. 8, which depicts an example graph of input-to-output voltage ratios of the current source rectifier according to one embodiment. The current source rectifier may be considered to operate in one of the following voltage ratio modes:

A. buck-buck mode: $v_k \geq v_o \wedge v_n \geq v_o$ with three sub-modes:
 a. $v_k > v_n$
 b. $v_k = v_n$
 c. $v_k < v_n$
B. buck-boost mode: $v_k > v_o \wedge v_n < v_o$
C. buck-equal mode: $v_k > v_o \wedge v_n = v_o$
D. equal-equal mode: $v_k > v_o \wedge v_n > v_o$
E. boost-buck mode: $v_k < v_o \wedge v_n > v_o$
F. equal-buck mode: $v_k = v_o \wedge v_n > v_o$ The letters A-F assigned to the voltage ratio modes above are important and will be described in more detail below. As long as the current source rectifier is operating in CCM with the duty cycles of equations 4 and 5 applied to switches $S_k$ and $S_n$, the fact that there are different voltage ratio modes can be ignored by the controller and the following linear relationship occurs between the output voltage $v_o$ and magnitude of the line-to-line input voltages $V_i$:

$$m_i = \frac{2}{\sqrt{3}} \cdot \frac{v_o}{V_i} \qquad 9$$

However, as the load is reduced, the current source rectifier will operate in DCM and the output voltages result for three representative values of $m_i$: one that should result in buck-buck modes ($m_i=0.577$), one that has all voltage ratio modes ($m_i=0.817$), and one that has only buck-boost, boost-buck, and equal-equal voltage ratio modes ($m_i=1.0$). As the current source rectifier load is reduced, it operates in three regions that have distinctive entry and exit characteristics. These conduction regions are identified as follows:

Region 0 (R0), CCM: the current source rectifier is always in CCM.

Figure 9:
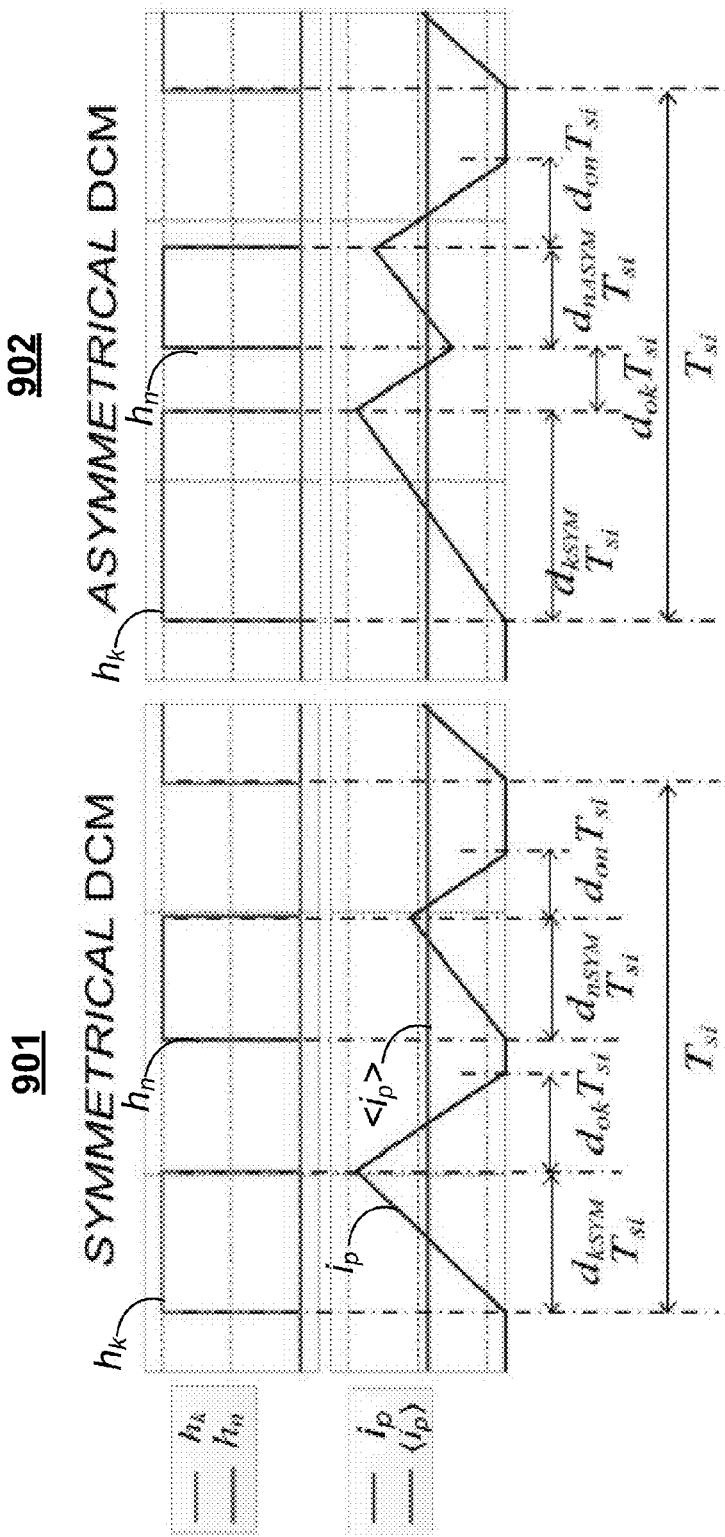
FIG. 9 depicts example graphs of the DC link current of the current source rectifier during symmetrical and asymmetrical discontinuous mode operation according to one embodiment.

Region 1 (R1), DCM (asymmetrical), one of the PWM-controlled switches gates on before the current in the DC link that resulted from the previous switch commutation going discontinuous (FIG. 9, graph 902).

Region 2 (R2), DCM (symmetrical): DC link current always goes discontinuous before each subsequent gating on of the PWM-controlled switches (FIG. 9, graph 901).

The region designations (R0-R2) are important and will be used as part of the proposed control description.

Embodiments described herein are also configured to detect the voltage ratio mode and conduction region for a current source rectifier at different time instants and to switch between different duty cycle calculations that result in nearly sinusoidal input currents and linear input-to-output voltage ratio. Embodiments can also generate feed-forward commands to calculate duty cycles to ensure input currents track the desired feed-forward commands. Embodiments are further configured to use (1) time-averaged or filtered DC link current feedback mechanisms, (2) switching frequency and DC link inductance parameters, (3) input and output voltage feedback in detecting conduction regions, (4) voltage ratio modes, and (5) calculation of duty cycles.

These embodiments can perform revised calculations for the duty cycles associated with the active switches to ensure that the relationships hold for the time-averaged input currents $<i_k>$ and $<i_n>$ (or filtered input currents $i_k'$ and $i_n'$) for the current source rectifier. Note that the third input phase current can be either the time average of the negative sum of $i_k$ and $i_n$ ($<-i_k-i_n>$) or the negative sum of the filtered currents $i_k'$ and $i_n'$ ($-i_k'-i_n'$)). These calculations can change depending upon voltage ratio modes and conduction region.

If the current source rectifier is operating in CCM, then the voltage ratio mode can be automatically taken into account through the use of equations 4 and 5 above. If balanced, sinusoidal input voltages are assumed then, in a given sector, the line-to-line voltages used by the circuits of FIGS. 4-6 can be calculated as follows:

$$v_k(\phi_i) = V_i \cdot \cos(\phi_i) \qquad 10$$

$$v_n(\varphi_i) = V_i \cdot \cos\left(\frac{\pi}{3} - \varphi_i\right) \qquad 11$$

where $V_i$ is the measured peak of the line-to-line voltage on any of the three-phase inputs. Two independent line-to-neutral voltages can be shown to be given by the following expressions:

$$v_{k0}(\varphi_i) = \frac{2 \cdot v_k(\varphi_i) - v_n(\varphi_i)}{3} \qquad 12$$

$$v_{n0}(\varphi_i) = \frac{2 \cdot v_n(\varphi_i) - v_k(\varphi_i)}{3} \qquad 13$$

where the third line-to-neutral voltage is simply the negative sum of the above two voltages. Substituting equations 10 and 11 results in the following expressions for equivalent applied line-to-neutral voltages:

$$v_{k0}(\varphi_i) = \frac{V_i}{\sqrt{3}} \cdot \sin\left(\frac{\pi}{3} - \varphi_i\right) \qquad 14$$

$$v_{n0}(\varphi_i) = \frac{V_i}{\sqrt{3}} \cdot \sin(\varphi_i) \qquad 15$$

If unity input power factor is desired (which is usually the case), then the desired time-averaged or filtered input currents should ideally be in phase with $v_{k0}$ and $vn_0$ and have the following forms:

$$\langle i_k \rangle(\varphi_i) = I_i \cdot \sin\left(\frac{\pi}{3} - \varphi_i\right) \qquad 16$$

$$<i_n>(\phi_i) = I_i \cdot \sin(\phi_i) \qquad 17$$

where $I_i$ is the fundamental peak phase current of the input current. Note the similarity between equations 16 and 17 with equations 4 and 5.

When the current source rectifier is operating in CCM, then the duty cycles of equations 4 and 5 can be used instead of DBCI-based duty cycles. Under this same condition, the input currents are related to the DC link current by the following relationships:

$$\langle i_k \rangle = m_i \cdot \langle i_p \rangle \cdot \sin\left(\frac{\pi}{3} - \varphi_i\right) \qquad 18$$

$$<i_n>(\phi_i) = m_i \cdot <i_p> \cdot \sin(\phi_i) \qquad 19$$

When the current source rectifier operates in DCM or CCM with significant DC link ripple currents, the objective of the DBCI-PWM control is to ensure that the following relationship holds:

$$i_x'(\varphi_i) = \langle i_x(\varphi_i) \rangle = \frac{v_{x0}'(\varphi_i)}{Z_i \cdot \cos(\phi_i)} = \frac{v_{x0}'(\varphi_i)}{Z_i \cdot DPF} \qquad 20$$

where x=k or n and the displacement power factor is DPF or DPF=$\cos(\theta_i)$.

The goal is to ensure that the time average of the pulsed input currents to the current source rectifier consist mostly of fundamental frequency components only sinusoidally varying quantities with amplitudes that are proportional to the equivalent line-to-neutral voltages. New duty cycles are derived by solving for duty cycle expressions in terms of the desired time-averaged (or filtered) input current. These duty cycles are functions of the DC link inductance $L_p$, the sector angle $\phi_i$, the two applied input voltages $v_k$ and $v_n$, and the user-selected output voltage $v_o^*$.

Different duty cycle functions can be preprogrammed into the controller depending upon the voltage ratio mode and conduction regions described above. The duty cycle expressions are found by solving for duty cycle given a set of independent equations as described below:

Symmetrical DCM, $v_k > v_o$ and $v_n > v_o$: time-averaged current in terms of peak current (di/dt times $T_x$, where x=k or n).

Symmetrical DCM, $v_k < v_o$ or $v_n < v_o$: time-averaged current in terms of peak current (di/dt times $T_x$, where x=k or n) and volt-second balance over the switching period.

Asymmetrical DCM: time-averaged current in terms of peak current (di/dt times $T_x$, where x=k or n), volt-second balance over the switching period and estimated DC link current at the end of the half switching periods.

CCM: time-averaged current in terms of peak current (di/dt times $T_x$, where x=k or n), volt-second balance over the switching period, estimated DC link current at the end of the half switching periods and time-averaged DC link current in terms of peak currents (di/dt times $T_x$, where x=k and n).

CCM requires either an estimate of the load (from a feed-forward command) or a measurement of the load. The other cases require no knowledge of the load for calculation. As an example of the above described expressions for duty cycle for the DBCI-PWM technique, consider symmetrical DCM operation with $v_k > v_o$ and $v_n > v_o$ or buck-buck mode. For the purposes of duty cycle selection by the control, the duty cycle expressions are referred to as $d_{k\_sym}$ and $d_{n\_sym}$. These duty cycle expressions will have the following forms:

$$d_{k_{sym}}(\varphi_i) = \sqrt{\frac{2 \cdot L_p \cdot f_{si} \cdot \langle i_k(\varphi_i) \rangle^*}{[v_k(\varphi_i) - v_o^*]}} \quad 21$$

$$d_{n_{sym}}(\varphi_i) = \sqrt{\frac{2 \cdot L_p \cdot f_{si} \cdot \langle i_n(\varphi_i) \rangle^*}{[v_n(\varphi_i) - v_o^*]}} \quad 22$$

As another example, consider symmetrical DCM operation with $v_n < v_o$ and $v_k > v_o$ or buck-boost mode. These duty cycle expressions will have the following forms:

$$d_{k_{sym}}(\varphi_i) = \sqrt{\frac{2 \cdot L_p \cdot f_{si} \cdot \langle i_k(\varphi_i) \rangle^*}{[v_k(\varphi_i) - v_o^*]}} \quad 23$$

$$d_{n_{sym}}(\varphi_i) = \frac{v_o^* - 2 \cdot v_k(\varphi_i) \cdot d_{k_{sym}}(\varphi_i)}{2 \cdot [v_o^* - v_n(\varphi_i)]} \quad 24$$

In equations 21-24, the angle $\phi_i$ and, subsequently, $v_k$ and $v_n$, are derived from the measured line-to-line input voltages through a line synchronization algorithm 328 as shown in FIG. 3A. The quantity $v_o^*$ is the user-selected output voltage. The parameters $L_p$ and $f_{si}$ can be pre-programmed variables and match the physics and implementation of the converter circuit.

Embodiments are further configured to detect when the current source rectifier is operating in DCM as opposed to CCM. This can be accomplished by utilizing the DC link current feedback $i_p$ and time-averaging this feedback $\langle i_p \rangle$. The time-averaged DC link current feedback is then compared against the calculated expressions for one half of the peak DC link current under DCM operation as shown in FIG. 3B. In these expressions, $d_k$ and $d_n$ are from equations 4 and 5. DCM operation is simply determined by checking to see if the averaged DC link current is less than one-half of the peak of the ripple current. If it is, then the current source rectifier is operating in DCM. However, the techniques described herein are not limited to any particular method for detecting when the current source rectifier is operating in DCM as many alternative techniques can be used. For instance, an integrator implemented in an analog or FPGA circuit can also be used.

Embodiments also provide a provision for determining whether the DCM is symmetric or asymmetric once DCM operation has been detected. Asymmetric DCM occurs if the current in the DC link fails to go discontinuous during either a freewheeling state or a user-selected state (i.e. buck-boost or boost-buck mode) before the next commanded switch state.

Determination of asymmetric DCM requires an estimation of freewheeling or on-times under DCM conditions. For example, in buck-buck mode, asymmetric DCM occurs when the following occurs:

$$d_{ok} > \frac{d_o}{2} \quad 25$$

where $$d_o = 1 - d_k - d_n \quad 26$$

and $$d_{ok} = \frac{L_p \cdot f_{si}}{v_o^*} \quad 27$$

At least certain embodiments address how the time-averaged current commands $\langle i_k \rangle^*$ and $\langle i_n \rangle^*$ in equations 21-24 are calculated. If the physics of the load is known by the controller, then:

$$\langle i_k(\varphi_i) \rangle^* = \langle i_p \rangle^* \cdot m_i \cdot \sin\left(\frac{\pi}{3} - \varphi_i\right) \quad 28$$

$$\langle i_n(\phi_i) \rangle^* = \langle \hat{i}_p \rangle^* \cdot m_i \cdot \sin(\phi_i) \quad 29$$

where $\langle i_p \rangle^*$ is derived from a feed-forward expression of output power $p_o^*$, divided by the user-selected output voltage $v_o^*$. If the voltage controller uses feedback controls, then $\langle i_p \rangle^*$ is not necessary and the time-averaged current commands become:

$$\langle i_k(\varphi_i) \rangle^* = (I_b \cdot \Delta m_i) \cdot \Delta m_i \cdot \sin\left(\frac{\pi}{3} - \varphi_i\right) \quad 30$$

$$\langle i_n(\phi_i) \rangle^* = (I_b \cdot \Delta m_i) \cdot \Delta m_i \cdot \sin(\phi_i) \quad 31$$

where $\Delta m_i$ can be the output of a Proportional Plus Integral regulator. If there is no feed-forward available in the controller, then the time-averaged input current commands only require $\Delta m_i$ because it reflects the averaged DC link current $\langle i_p \rangle^*$ as needed by the load in order to maintain the actual output voltage $v_o$ equal to the user-selected output voltage $v_o^*$.

FIG. 9 depicts example graphs of the DC link current of the current source rectifier during symmetrical and asymmetrical discontinuous mode operation according to one embodiment. FIG. 9 shows the current source rectifier variables zoomed in over one switching period at a point between $\phi_i=0$ and $\phi_i=\pi/6$ (assuming positive sequence) operating in buck-buck symmetric DCM. The most straightforward example is when the current source rectifier is operating in buck-buck symmetrical DCM as shown in graph 901 of FIG. 9. The circuit is operating in buck-buck mode when $v_k > v_o$ and $v_n > v_o$ (see FIG. 8). When $m_i < 0.577$ the current source rectifier operates in the buck-buck voltage mode regardless of the position of $\phi_i$. Symmetric DCM is characterized by the fact that the DC link inductor current freewheels down to zero (goes discontinuous) before each subsequent switching event.

Graph 902 of FIG. 9 shows the current source rectifier variables in buck-buck asymmetrical DCM. DCM is characterized by the fact that a subsequent switching event occurs when the DC link current has freewheeled completely to zero in a half switching period in the 'z' state associated with the turn-off of either $S_k$ or $S_n$. This condition can occur as the load has increased from the operating load where the current source rectifier is operating in buck-buck symmetrical DCM, or it may occur at the same operating load as buck-buck symmetrical DCM, but when the switching frequency $f_{si}$ is increased or the inductance $L_p$ is reduced. The condition of asymmetrical DCM within a given half switching period can be determined independently of the subsequent switching period.

Figure 10:
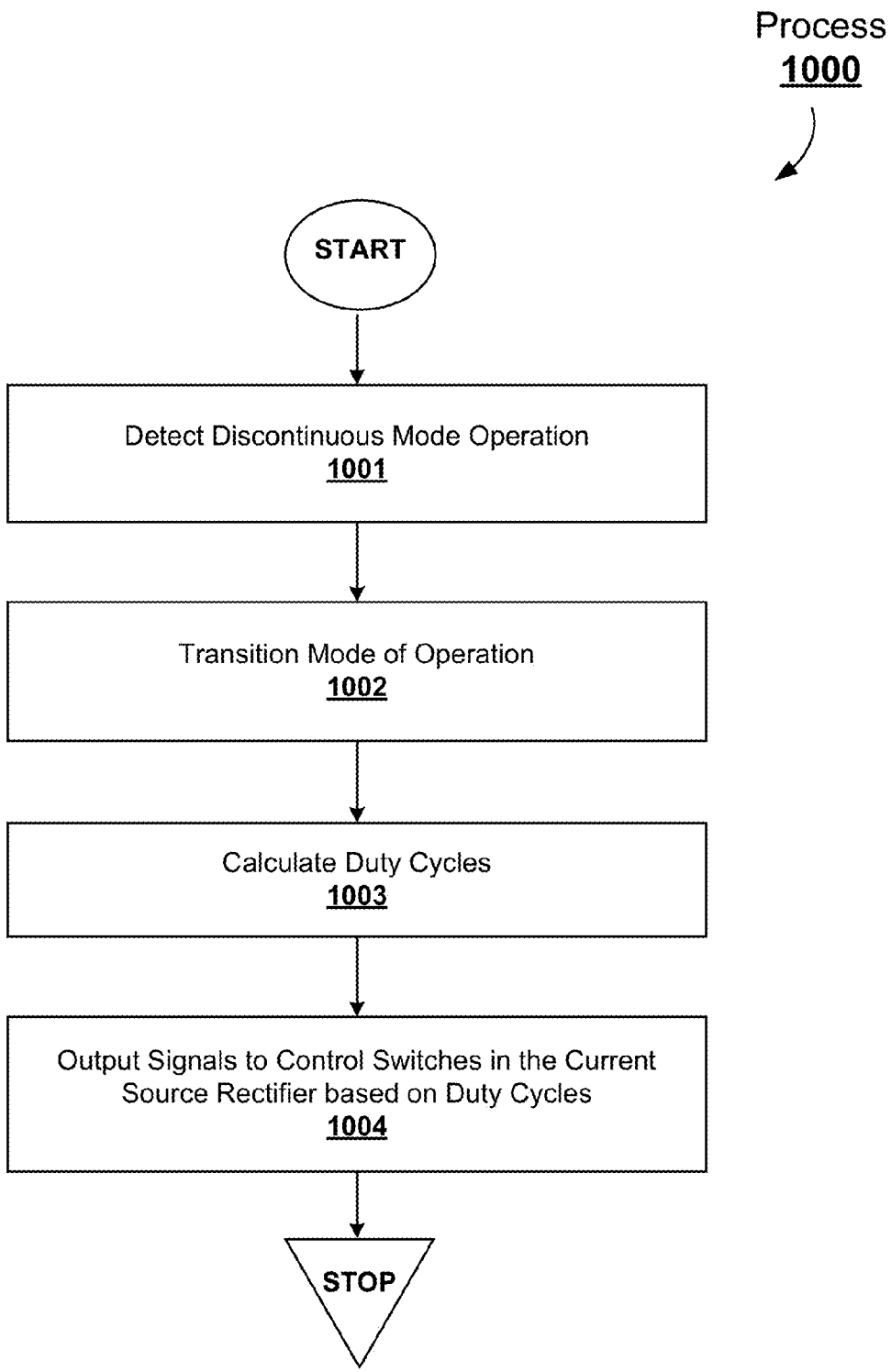
FIG. 10 depicts an example flow chart of a process for controlling a current source rectifier according to one embodiment.

FIG. 10 depicts an example flow chart of a process for controlling a current source rectifier according to one embodiment. The current source rectifier controller of this disclosure is configured to transitioning between continuous and discontinuous modes of operation based on detecting when the DC link current is continuous or discontinuous. In the illustrated embodiment, process 1000 begins at operation 1001 wherein the DC link current of the current source rectifier becomes discontinuous during operation. The controller then transitions the current source rectifier to a mode of operation based on whether the DC link current is continuous or discontinuous (operation 1002).

Once in DCM, the controller calculates the duty cycles for the current source rectifier accordingly (operation 1003). In one embodiment, DCM is detected when a feedback signal from DC link current through the DC link inductor of the current source rectifier becomes less than one-half of the peak ripple current on the input of the current source rectifier. In DCM, the duty cycles are calculated in DCM based on the input-to-output voltage ratios. The duty cycles are calculated differently depending on whether one or more input voltages applied to the current source rectifier are greater than, equal to, or less than output voltage of the current source rectifier. These are referred to herein as the voltage ratio modes A-F discussed above.

In the preferred embodiment, in DCM, the duty cycles are further calculated based on whether the current source rectifier is operating in the symmetric or asymmetric conduction region. The asymmetric conduction region occurs when DC link current through the DC link inductor of the current source rectifier becomes discontinuous after a next duty cycle (or switching period) has already begun. The symmetric conduction region, on the other hand, occurs when the DC link current becomes discontinuous before the next duty cycle. These are referred to herein collectively as the conduction regions R0-R2 discussed above.

Process 1000 continues at operation 1004 where the controller output electrical control signals to turn on one or more of the active electrical switches in the current source rectifier based on the calculated duty cycles. Controlling the active switches in the current source rectifier in this manner enables the input currents of the current source rectifier to approximate sinusoidal input currents during both the continuous and discontinuous modes of operation. In the preferred embodiment, the turn-on times for the electrical switches in the current source rectifier are determined for every 60-degree sector of an electrical cycle as depicted in the phasor diagram of FIG. 8.

Figure 2:
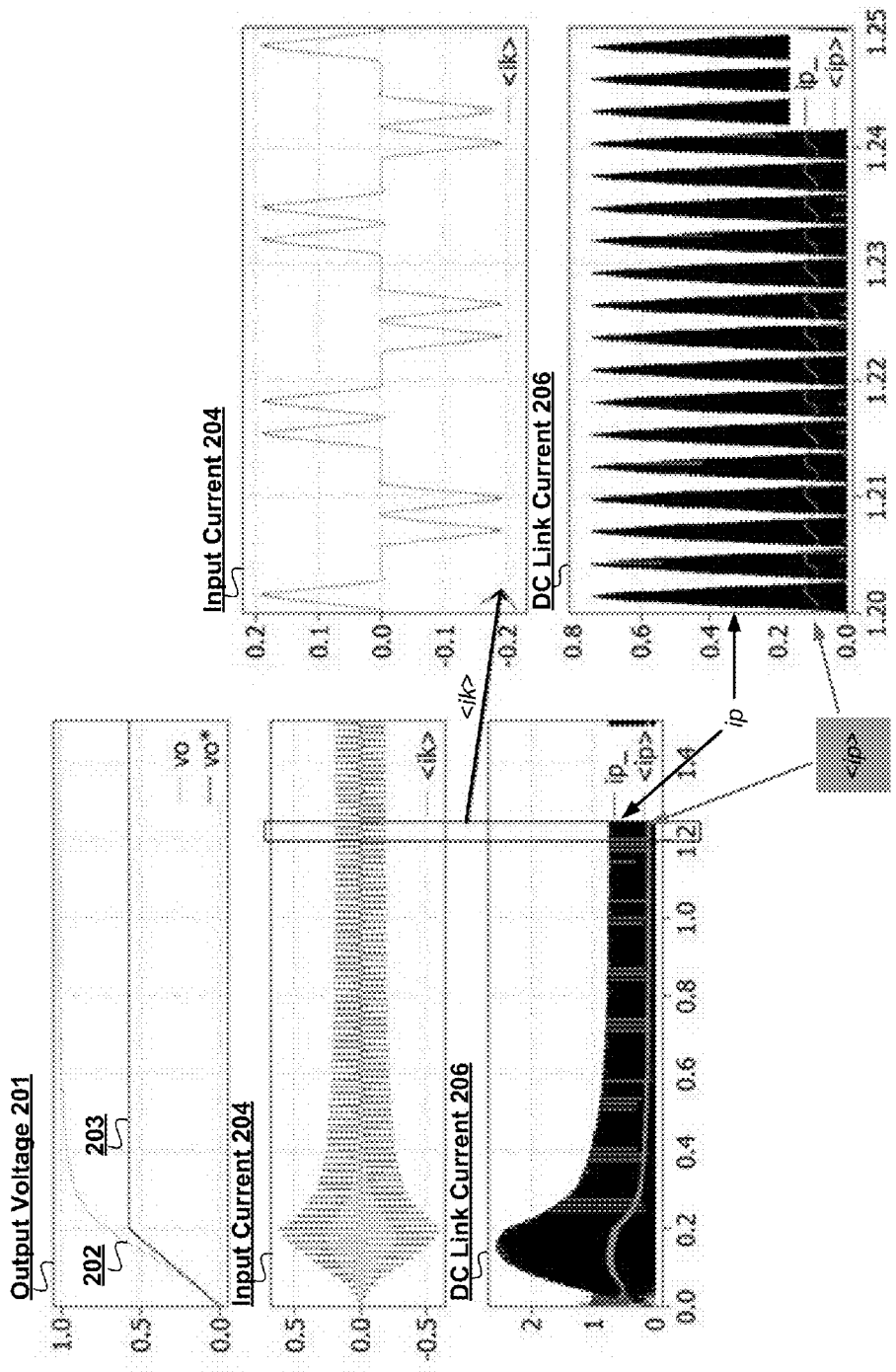
FIG. 2 depicts example graphs showing characteristics of a conventional current source rectifier during discontinuous conduction mode of operation.
Figure 11:
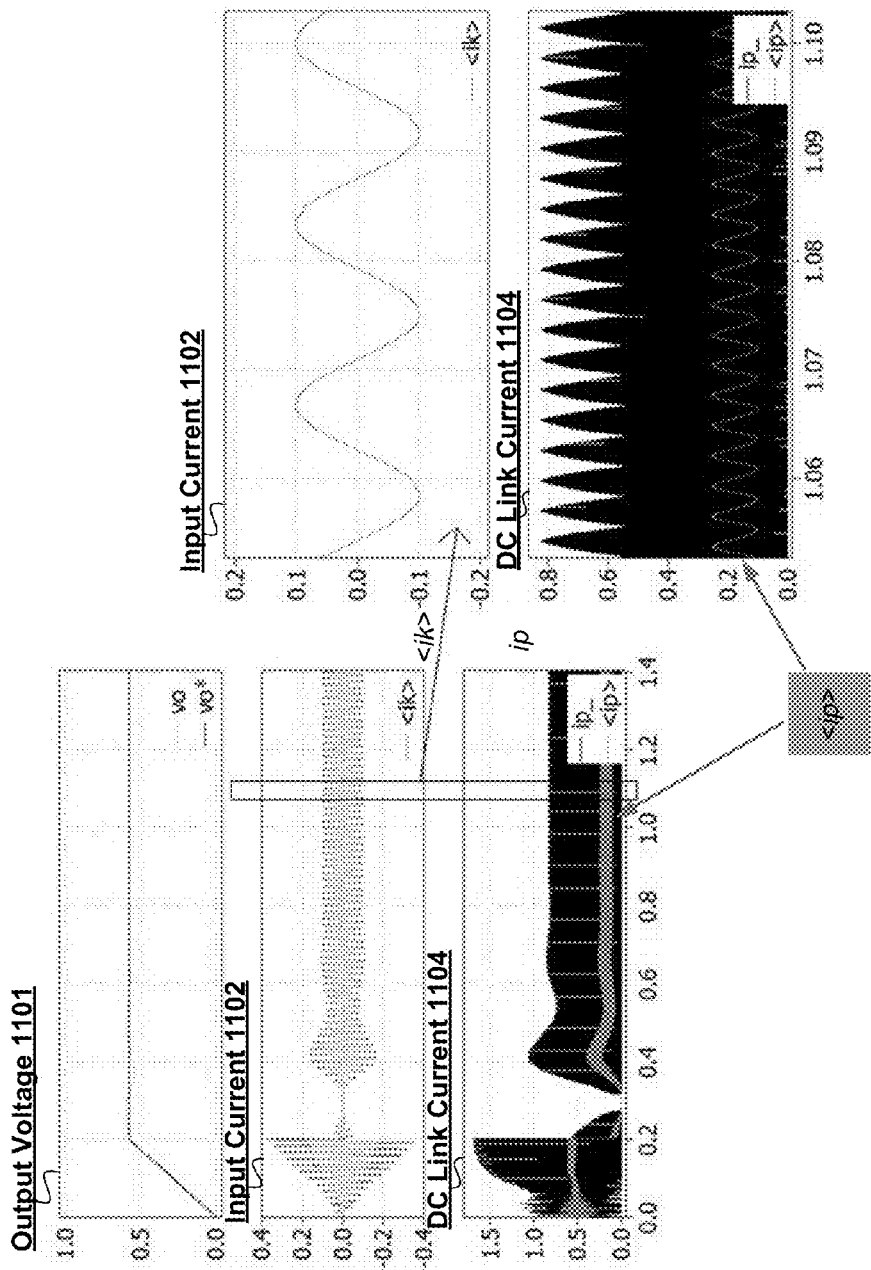
FIG. 11 depicts an example graph of input currents for the current source rectifier during discontinuous conduction mode according to one embodiment.

Embodiments are further configured to address the use of DC link current, time-averaged DC link current or real-time estimates of DC link current, not only for the determination of DCM operation versus CCM operation, but also in the determination for expressions for duty cycles in asymmetric DCM operation. The full implementation of the techniques described herein results in both approximated sinusoidal input currents and linear input-to-output voltage ratios. Some typical results can be seen in FIG. 11. These results should be compared to the results from conventional systems as shown in FIG. 2. For instance, the output voltage graph 1101 of FIG. 11 shows little or no overshoot of the output voltage at turn-on time. In addition, graphs 1102 show that the time-averaged input current $<i_k>$ closely approximates a sinusoidal signal.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A controller for a current source rectifier, comprising:
a discontinuous mode detection unit configured to determine when DC link current of the current source rectifier becomes discontinuous;
a duty cycle calculation unit adapted to calculate duty cycles for the current source rectifier for operation in a continuous or discontinuous mode based on whether the DC link current is continuous or discontinuous;
a plurality of drivers coupled with the duty cycle calculation unit to output electrical control signals to turn on one or more electrical switches in the current source rectifier based on the calculated duty cycles, wherein time periods the electrical switches are turned on are determined by the calculated duty cycles,
wherein the controller is adapted to transition to a mode of operation to provide an input current that approximates a sinusoidal input current during both the continuous and discontinuous modes of operation.

2. The controller of claim 1, wherein the mode of operation is a dead-beat current injection ("DBCI") pulse width modulation ("PWM") mode of operation.

3. The controller of claim 1, wherein the duty cycle is calculated differently when the current source rectifier is operating in continuous or discontinuous modes.

4. The controller of claim 1, wherein the discontinuous mode detection unit is configured to detect when the current source rectifier is operating in discontinuous mode by determining when a feedback signal from DC link current through an inductor of the current source rectifier is less than one-half of the peak ripple current on the input of the current source rectifier.

5. The controller of claim 4, wherein duty cycles in discontinuous mode are calculated based on input-to-output voltage ratio detected by the discontinuous mode detection unit, wherein the duty cycles are calculated differently depending on whether one or more input voltages applied to the current source rectifier are greater than, equal to, or less than output voltage of the current source rectifier.

6. The controller of claim 5, wherein the duty cycles in discontinuous mode are further calculated based on whether the current source rectifier is operating in a symmetric or asymmetric conduction mode, wherein asymmetric conduction mode occurs when DC link current through an inductor of the current source rectifier becomes discontinuous after a next duty cycle.

7. The controller of claim 6, wherein symmetric conduction mode occurs when the DC link current becomes discontinuous before the next duty cycle.

8. The controller of claim 6, wherein the duty cycle in discontinuous conduction mode during symmetric conduction is proportional to a ratio of the desired input current to the input-to-output voltage ratio.

9. The controller of claim 6, wherein the duty cycle in discontinuous conduction mode during asymmetric conduction is proportional to the desired input current multiplied by the input-to-output voltage ratio.

10. The controller of claim 1, wherein turn-on times for the electrical switches in the current source rectifier are determined for every 60-degree sector of an electrical cycle of input voltages and currents to the current source rectifier.

11. The controller of claim 1, wherein the controller is further adapted to calculate a modulation index for controlling pulse widths of the output control signals.

12. The controller of claim 1 further comprising a voltage regulator having feedback and feed-forward controls.

13. A method for controlling a current source rectifier comprising:
    determining when DC link current of the current source rectifier becomes discontinuous;
    calculating duty cycles duty cycles for the current source rectifier for operation in a continuous or discontinuous mode based on whether the DC link current is continuous or discontinuous; and
    providing output electrical control signals to turn on one or more electrical switches in the current source rectifier based on the calculated duty cycles, wherein time periods the electrical switches are turned on are determined based on the calculated duty cycles, and
    wherein the controller is adapted to transition to a mode of operation to provide an input current that approximates a sinusoidal input current during both the continuous and discontinuous modes of operation.

14. The method of claim 13, wherein the mode of operation is a dead-beat current injection ("DBCI") pulse width modulation ("PWM") mode of operation.

15. The method of claim 13, wherein the duty cycles are calculated differently based on whether the current source rectifier is operating in continuous or discontinuous mode.

16. The method of claim 13, wherein discontinuous mode is detected when a feedback signal from DC link current through an inductor of the current source rectifier is less than one-half of the peak ripple current on the input of the current source rectifier.

17. The method of claim 13, further comprising calculating the duty cycles in discontinuous mode based on the input-to-output voltage ratio, wherein the duty cycles are calculated differently depending on whether one or more input voltages applied to the current source rectifier are greater than, equal to, or less than output voltage of the current source rectifier.

18. The method of claim 13, further comprising calculating the duty cycles in discontinuous mode based on whether the current source rectifier is operating in a symmetric or asymmetric conduction mode, wherein asymmetric conduction mode occurs when DC link current through an inductor of the current source rectifier becomes discontinuous after a next duty cycle.

19. The method of claim 18, wherein symmetric conduction mode occurs when the DC link current becomes discontinuous before the next duty cycle.

20. The method of claim 18, wherein the duty cycle in discontinuous conduction mode during symmetric conduction is proportional to a ratio of the desired input current to the input-to-output voltage ratio.

21. The method of claim 18, wherein the duty cycle in discontinuous conduction mode during asymmetric conduction is proportional to the desired input current multiplied by the input-to-output voltage ratio.

22. The method of claim 13, further comprising determining turn-on times for the electrical switches in the current source rectifier for every 60-degree sector of an electrical cycle of input voltages and currents to the current source rectifier.

23. The method of claim 13, further comprising calculating a modulation index for controlling pulse widths of output control signals.

* * * * *